United States Patent Office 2,934,523
Patented Apr. 26, 1960

2,934,523

CONDENSATION PRODUCTS OF DICYANDIAMIDE, A SALT OF ETHYLENE DIAMINE, AND FORMALDEHYDE

Otto Albrecht, Neuewelt, near Basel, and Armin Hiestand, Basel, Switzerland, assignors to Ciba Limited, Basel, Switzerland, a Swiss firm No Drawing. Application August 8, 1955
Serial No. 527,126

Claims priority, application Switzerland August 9, 1950

14 Claims. (Cl. 260—70)

This is a continuation in part of our application Serial No. 240,066.

According to this invention new condensation products are made by condensing in a first stage (a) dicyandiamide, with (b) a neutral, water-soluble salt of an inorganic acid with an aliphatic amine containing at least two primary or secondary amino groups, and (c) an aldehyde in the absence of water at a temperature above 100° C. and below the decomposition point of the condensation product, and, if desired, condensing in a second stage the product so obtained with (d) an aldehyde, or with an aldehyde and with (e) a water-soluble salt of an nitrogenous base.

As an aldehyde for making the condensation products of the invention there may be used principally formaldehyde. However, other aldehydes may be used, for example, acetaldehyde or acrolein.

When formaldehyde is used as the aldehyde in the condensation of the first stage, it is advantageously used in the form of para-formaldehyde, whereas in the condensation of the second stage a concentrated aqueous formaldehyde solution is preferred.

Among the salts of aliphatic amines containing at least two primary or secondary amino groups, i.e. amino groups in which at least one hydrogen atom is connected with the nitrogen atom of the amino group, there come into consideration, for example, salts of alkylene diamines, such as ethylene diamine, 1:3-propylene diamine or 1:6-hexamethylene diamine, and also salts of their alkyl or hydroxyalkyl substitution products, provided that they conform to the above definition. Instead of salts of alkylene diamines there may be used salts, for example, the hydrochlorides, of polyalkylene polyamines, such as diethylene triamine, triethylene tetramine, tetraethylene pentamine or polyaklyene polyamines of higher molecular weight. Of particular interest are the salts of amines which correspond to the formula

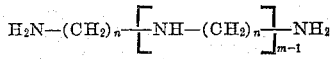

in which m represents a whole number of at the most 3 and n represents a whole number of at least 2 and at the most 3. Furthermore, there may be used salts of polyamines such as are obtainable by heating an ethylene dihalide or a glycerine dichlorhydrin with ammonia or an amine, for example, an alkanolamine such as monoethanolamine.

As salts of the aforesaid amines there are used salts with inorganic acids. The halides, especially the hydrochlorides are preferably used.

The condensation of the first stage may be carried out by heating the reaction components in the presence of an inert solvent. As solvents there are advantageously used high boiling aliphatic alchols, such as butanols, amyl alcohols, 2-ethyl-butanol or 2-ethyl-hexanol. If solvents boiling below 100° C. are used for the reaction it is necessary to work in a closed vessel. The reaction temperature may vary within wide limits, for example, within the range of 100–200° C. The condensation is advantageously conducted at the boiling temperature of the solvent, for example, of butanol. The condensation of the first stage may, however, be carried out by simple melting of the components together at about 100–250° C., preferably 120–250° C.

The relative proportions of the individual components may vary within wide limits. However, it is of advantage to use at least one molecular proportion of formaldehyde for each molecular proportion of dicyandiamide. Suitable proportions are, for example, one molecular proportion of a neutral salt of a diamine or triamine (as defined above), 2 molecular proportions of dicyandiamide, and 4 molecular proportions of formaldehyde used in the form of paraformaldehyde.

The condensation of the first stage may advantageously be carried out by first reacting the dicyandiamide with the neutral salt of the aliphatic amine containing at least two primary or secondary amino groups, and then reacting the condensation product so obtained with the aldehyde at a temperature above 100° C. For this purpose the dicyandiamide may be heated with the salt of the aliphatic amine, for example at 150–260° C., whereby ammonia is usually split off. It is of special advantage to subject to this process a mixture of 2 molecular proportions of dicyandiamide and about 1 molecular proportion of ethylene diamine dihydrochloride, and to heat the mixture at about 180–260° C., for instance at 210–260° C. The process may be so carried out, for example, that a portion of the mixture of the aforesaid components to be reacted is heated at 180–210° C., and then the remainder of the mixture is introduced at the aforesaid temperature into the liquefied reaction mixture. A convenient form of the process consists in introducing the aforesaid mixture into a reaction vessel heated at a temperature above 200° C., for example, 250–255° C. The condensation product of the dicyandiamide with the salt of the aliphatic amine may be reacted with an aldehyde at a temperature above 100° C. in the presence or absence of a solvent or diluent. For example, the aforesaid condensation product may be mixed with paraformaldehyde and the mixture heated at 170–180° C. With this procedure, however, in some cases reaction products are formed which are difficult or impossible to stir. It is therefore recommended to carry out the condensation with paraformaldehyde in the presence of a solvent or diluent such as glacial acetic acid or tetrahydrofurfuryl alcohol. It is advantageous to add these solvents at a temperature at which the reaction mixture is still stirrable, which is in many cases still possible when the temperature of the reaction mixture is higher than the boiling point of the solvent. When glacial acetic acid is used, which is especially suitable as a solvent, the reaction with the aldehyde, preferably paraformaldehyde, can be conducted at about 105–130° C.

It is very advantageous to add boric acid during the first stage condensation. One equivalent of boric acid is appropriately used for every free primary or secondary amino group of the amine salt used in the first stage.

With regard to the relative proportions of the individual components it is of advantage to use at least 0.25 molecular proportion, and preferably 0.5 to 2, molecular proportions of formaldehyde for each molecular proportion of dicyandiamide. Suitable proportions are, for example, 2 molecular proportions of dicyandiamide, 1 molecular proportion of the salt of a diamine, and 0.8 to 2 molecular proportions of formaldehyde used in the form of para-formaldehyde. However, 3 to 6 molecular proportions of formaldehyde in the form of paraformaldehyde may also be used.

For carrying out the condensation of the second stage the components by themselves, if desired in the presence of a solvent, or with the addition of a substance of alkaline or acid reaction are condensed with the aid of heat for example, at a temperature exceeding 70° C., advantageously at 90–100° C. As acids to be added there are suitable inorganic acids, such as hydrochloric acid or sulfuric acid, or water-soluble organic acids, especially fatty acids of low molecular weight, such as formic acid or acetic acid. As substances of alkaline reaction, which may be added to the reaction mixture, there come into consideration above all alkali hydroxides and alkali carbonates. The quantity of the substance of acid or alkaline reaction to be added may vary within wide limits. The condensation may, if desired, be carried out under pressure. The period of reaction depends on the reaction temperature and the ease with which the starting materials react. When the reaction is alkaline, for example, at a pH value of about 9, a short heating at about 90–100° C. usually suffices. In this manner, that is to say by heating the components for a short time in a weakly alkaline solution, very suitable products are obtained. When the condensation is conducted in the presence of a solvent, for example, water, the solvent may be removed advantageously under reduced pressure in order to obtain a concentrated preparation.

The relative proportions of the starting materials used in the latter reaction may also vary within wide limits. Especially suitable products are obtained by using at least one molecular proportion, and advantageously 2–6 molecular proportions, of formaldehyde calculated on each molecular proportion of the condensation product obtained in the condensation of the first stage.

If, in the condensation of the second stage, there is used in addition to an aldehyde a water-soluble salt of a nitrogenous base, it is of advantage to use an ammonium salt. As such there can be used those of the usual inorganic acids, such as ammonium sulfate and especially ammonium halides, advantageously ammonium chloride. The water-soluble amine salts may be derived from the amines mentioned above. There may, however, be used salts of other amines, for example, of aromatic amine such as aniline, or heterocyclic amines such as piperidine.

If the condensation of the second stage is carried out with aldehyde and a salt of a nitrogeous base, the same or nearly the same quantity of aldehyde can be used as are employed when the condensation is carried out with aldehyde alone. For each mol of the condensation product (preferably from 1 mol of amine salt and 2 mols of dicyandiamide) 2 to 10 mols of formaldehyde can be used. Advantageously, 1 mol of aldehyde is used per basic group in the ammonium or amine salt used in the second stage. Furthermore, it is of advantage to use 1 to 10 mols of these salts per mol of the amine salt used for the condensation product of the first stage. Suitable quantities are, for example, 4 to 8 mols of ammonium chloride for 2 mols of dicyandiamide. For the rest, the prescriptions concerning additives, reaction temperatures and other reaction conditions given above for the condensation with aldehyde alone apply to the condensation of the second stage with aldehyde and an ammonium or amine salt. In all these cases the preferred solvent is water.

In order to obtain a concentrated product, advantageously a dry product, the solvent is removed advantageously under reduced pressure. The condensation of the second stage can be carried out, as stated above, by reacting all the components together. Alternatively, there may be reacted with the reaction product of the first stage, first the aldehyde and then the ammonium salt or amine salt. This form of the process may be modified by using additional aldehyde in the subsequent reaction with the ammonium salt or amine salt.

The condensation products obtainable by the process of the invention, insofar as they are soluble, at least in the form of their salts, are suitable for improving the properties of wet fastness of dyeings and prints produced from water-soluble direct-dyestuffs which owe their solubility in water to the presence of sulfonic acid groups or carboxylic acid groups. For this purpose the dyeings or prints are after-treated in an aqueous solution of the condensation product. This after-treatment may be combined with a treatment with a water-soluble copper compound. By these treatments a substantial improvement in the fastness to water and washing of the dyeings and prints is obtained.

The dyeing and prints, of which the fastness properties are to be improved by the present process, may be produced on any desired material, for example, on fibrous material of animal origin such as wool or silk, but more especially on fibrous materials containing cellulose, such as cotton, linen and artificial silk and staple fibers of regenerated cellulose and the like. For producing the dyeings or prints there are used direct-dyeing dyestuffs which are soluble in water and in the usual dyebaths which may if desired be weakly alkaline, for example, rendered alkaline with sodium carbonate, inclding those which may already contain metal in complex union. When the after-treatment includes a treatment with a copper compound, there may be used with special advantage dyeings or print produced with water-soluble direct-dyeing dyestuffs containing at least once the atomic grouping

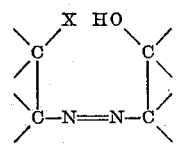

in which the pair of carbon atoms to which X is bound belong to the residue of a cyclic-diazo component, and the pair of carbon atoms to which the HO— group is bound belong to the residue of any desired coupling component, and X represents a hydroxyl or carboxyl group.

If desired, the direct dyeing dyestuffs used may contain in the molecule, instead of or besides the atomic grouping of the above constitution, another atomic grouping capable of forming metal complexes such, for example, as the salicyclic acid grouping.

The after-treatment of the dyeings or prints with aqueous solutions of the aforesaid condensation products, which solutions may, for example, be of 0.05 to 0.4 percent strength, may be carried out at room temperature or at raised temperature for example at 70–75° C.

The after-treatment baths may contain, besides the aforesaid condensation products, soluble copper salts, for example copper sulfate, copper formate or copper acetate. The use of the copper salts in many cases prevents or reduces to a small amount the impairment in the fastness to light of the dyeings or prints which may be caused by the aforesaid condensation products. The addition of the copper compounds can also have a favorable influence on the improvement in the fastness to washing.

Instead of the aforesaid copper salts of inorganic or organic acids there may be used water-soluble complex copper salts. Among these complex copper salts, for example, the complex formates, acetates, sulfates, chlorides or nitrates there may be mentioned those containing for example, ammonia or an amine, such as trimethylamine, trimethanolamine, ethylene diamine, pyridine or 8-aminoquinoline. Among these complex copper salts there may be mentioned: Cupric tetrammine acetate, cupric tetrammine sulfate, cupric tetrammine sulfamate, cupric tetrammine nitrate, diethylene diamine cupric acetate, and also the complex compound of cupric acetate and triethanolamine. There also come into consideration complex copper compounds of hydroxycarboxylic acids, such as glycollic acid, lactic acid or tartaric acid, for example, copper sodium tartrate (known in solution as Fehling's solution).

The use of complex copper salts instead of the non-complex copper salts can have the advantage that the fastness to washing is more strongly enhanced or the impairment in the fastness to light which may be caused by the aforesaid condensation products becomes less pronounced than if the non-complex copper salts were used.

The above mentioned dicyandiamide-formaldehyde condensation products are also especially suitable for use in conjunction with water-soluble copper compounds.

Instead of using the copper compounds in conjunction with the aforesaid condensation products, they may be applied in a separate bath after the treatment with the condensation product. In general, however, a single bath after-treatment is preferable owing to its greater simplicity.

When complex copper salts are to be used together with the aforesaid aldehyde condensation products, the after-treatment bath may be prepared by dissolving the condensation product and the complex copper compound in water.

There may also be used for preparing the after-treatment baths containing copper compounds, mixtures which contain both a condensation product as aforesaid and a copper compound which may be non-complex or complex.

The condensation products of this invention and combinations thereof with copper salts are also excellently suited for being added to baths intended for making the fabrics crease-resistant. By the simultaneous use of such baths a material is obtained which is crease-proof and whose dyeing possesses good wash-fastness properties.

The following examples illustrate the invention, the parts being by weight unless otherwise stated and the relationship of parts by weight to parts by volume being the same as that of the kilogram to the liter:

*Example 1*

30.9 parts of diethylene triamine are converted into the trihydrochloride in the usual manner, for example, by means of aqueous hydrochloric acid, the resulting hydrochloride is then dehydrated and mixed with 50.4 parts of finely pulverized dicyandiamide and 37.7 parts of para formaldehyde as well as 150 parts by volume of n-butanol, and the mixture is heated at the boil for 20 hours under reflux, while stirring. After cooling the supernatent solvent is poured off and the residue insoluble in butanol is freed from adherent solvent. The condensation product so obtained is a solid mass, which dissolves slowly in boiling water.

45 parts of the latter condensation product are dissolved with heat in 31.5 parts of a formaldehyde solution of 36.8 percent strength by weight of 37.5 parts of water, and then, after cooling, the pH value is adjusted to about 9 by the addition of about 3.3 parts by volume of sodium hydroxide solution of 30 percent strength. The reaction mixture is then maintained at a temperature of 90–95° C., for about 10 minutes. After drying at 50–60° C., advantageously under reduced pressure, the new formaldehyde derivative consists of a solid mass soluble in hot water. Instead of para-formaldehyde acetaldehyde may be used.

*Example 2*

26.6 parts of ethylene diamine dihydrochloride and 33.6 parts of finely pulverized dicyandiamide are mixed together, and then the mixture is liquefied by heating it at about 145–155° C. Then 12 parts of paraformaldehyde are added in small portions in the course of about 30 minutes at 145–148° C., and then the reaction mixture is heated in 240° C. slowly, for example, in the course of about ¾ hour. After being cooled, the new condensation product is a pale coloured pulverizable mass, which can be taken up in water to form a clear solution.

20 parts of this condensation product are introduced into 9 parts of formaldehyde solution of 36.8 percent strength by weight with the addition of 20 parts of water at about 50–55° C., whereupon the greater part of the condensation product passes into solution. By the addition of about 2.1 parts by volume of sodium hydroxide solution of 30 percent strength the pH value is adjusted to 9 at about 30° C., and then the whole is heated for about 10 minutes at about 90–95° C., while stirring. After being dried at about 50–55° C., advantageously under reduced pressure the new formaldehyde derivative is a pale pulverizable mass which is soluble in water.

The dihydrobromide of ethylene diamine may be used in the above reaction instead of the dihydrochloride.

*Example 3*

532.8 parts of ethylene diamine dihydrochloride and 672.3 parts of dicyandiamide are mixed together, and then the mixture is introduced in the course of about 2 hours in small portions while stirring into a flask which is immersed in a heating bath having a temperature of 250–255° C. An easily stirrable melt is formed. The internal temperature is finally 250–252° C. The whole is further stirred for 1 hour at an internal temperature of 250–255° C. Upon introducing the mixture and continued stirring ammonia is split off. The internal temperature is then lowered to about 155° C., and then 147 parts of glacial acetic acid are run in in the course of about 5 minutes. By further cooling the internal temperature is lowered to about 113° C., and 107.1 parts of para-formaldehyde are introduced in the course of about 15 minutes. The internal temperature is then allowed to fall to 100° C., and 363.5 parts of aqueous formaldehyde solution of 37.1 percent strength are added in the course of about 5 minutes. The whole is heated for about 10–15 minutes in a boiling water bath, whereupon the reaction mixture begins to thicken, 600 parts of water at about 90° C. are run in and the whole is further heated for a total of 2 hours in the boiling water bath. After about 20 minutes a clear solution is obtained. The internal temperature is lowered to about 50° C., the mixture is neutralized by the addition of sodium bicarbonate, and the reaction product is dried at 50–60° C. under reduced pressure. There is obtained an almost colorless solid residue which is soluble to a clear solution in boiling water.

*Example 4*

A mixture of 177.6 parts of ethylene diamine dihydrochloride and 224.4 parts of dicyandiamide is heated in the course of about ¾ hour up to 200° C., and the mixture is stirred as soon as it begins to liquefy. A mixture of 355.2 parts of ethylene diamine dihydrochloride and 448.8 parts of dicyandiamide is then introduced in the course of about 1 hour at 200–205° C. The whole is stirred for 2 hours at 200–205° C., the internal temperature is allowed to fall to 130° C., and 294.2 parts of glacial acetic acid are added in the course of about 5 minutes. 407 parts of para-formaldehyde are then introduced in the course of about 50 minutes, and then 338 parts of water at 80° C. are introduced, and the whole is heated for 30 minutes in a boiling water bath. 684 parts of aqueous formaldehyde solution of 36.6 percent strength are added, and the whole is heated for about 2 hours in a boiling water bath. The clear solution so obtained is adjusted to a pH value of about 6 by the addition of sodium bicarbonate, and is evaporated to dryness at 50–60° C. under reduced pressure. There is obtained an almost colorless solid residue, which is soluble in boiling water.

*Example 5*

A mixture of 14.8 parts of ethylene diamine dihydrochloride and 18.7 parts of dicyandiamide is heated in the course of ¾ hour to 185° C., and the mixture is mechanically stirred as soon as it begins to liquefy. A mixture of 29.6 parts of ethylene diamine dihydrochloride and 37.4 parts of dicyandiamide is then added at 180-185° C. in the course of about 1 hour, stirring is continued for about 2 hours at 200-205° C., and the whole is then allowed to cool to 140° C. and 19.6 parts of glacial acetic acid are run in in the course of about 5 minutes. 55.8 parts of para-formaldehyde are then added in small portions at an initial temperature of 122° C. in the course of about 40 minutes, during which the temperature is allowed to fall to 113° C. The whole is stirred for 2 hours at 111-113° C., the internal temperature is allowed to fall to 90° C., 102 parts of water at 80° C. are added, and the whole is heated for 2 hours in a boiling water bath. The solution so obtained, which has a pH value of 4.5, is dried at 50-60° C. under reduced pressure. There is obtained an almost colorless solid residue which dissolves in hot water.

Example 6

A mixture of 22.2 parts of ethylene diamine dihydrochloride and 28 parts of dicyandiamide is heated in the course of about 45 minutes to 185° C., and the mass is mechanically stirred as soon as it begins to liquefy. A mixture of 44.4 parts of ethylene diamine dihydrochloride and 56 parts of dicyandiamide is then added in the course of about 1 hour at 180-185° C., the whole is heated for 4 hours at 200-205° C., and then allowed to cool to 175-180° C. There are then added at first 13.1 parts of para-formaldehyde in the course of about 15 minutes while stirring, 15 parts of tetrahydrofurfuryl alcohol are run in and a further 6.7 parts of paraformaldehyde are added at 175-180° C. The whole is stirred for 1 hour at 175-180° C., and the temperature is then allowed to fall to 130° C. Steam is then blown into the reaction vessel, and the whole is further heated in a boiling water bath. In this manner 215 parts of a clear solution are obtained. The solution is mixed with 153 parts of formaldehyde solution of 36.8 percent strength and 20 parts of glacial acetic acid. The whole is heated for 5½ hours in a boiling water bath, and the resulting solution is dried at 50-60° C., under reduced pressure. There is obtained an almost colorless solid residue, which is soluble in hot water.

Example 7

25 parts of monomethylol-dicyandiamide and 14.6 parts of ethylene diamine dihydrochloride are mixed together, and heated in the course of 1 hour to 250° C., and the mass is mechanically stirred as soon as it begins to liquefy. 30 parts of the reaction product so obtained are dissolved in 27 parts of aqueous formaldehyde solution of 36.8 percent strength, then the pH value is adjusted to 9 by the addition of sodium hydroxide solution of 30 percent strength, the whole is heated for 10 minutes in the boiling water bath, and the resulting solution is evaporated to dryness at 50-60° C. under reduced pressure. There is obtained an almost solid residue, which is soluble in hot water.

The above mentioned monomethylol-dicyandiamide may be obtained in the following manner:

84 parts of dicyandiamide are dissolved in 81.5 parts of aqueous formaldehyde solution of 36.8 percent strength at 78-80° C., the pH value is adjusted to 9 by the addition of about 0.2 part of sodium hydroxide solution of 30 percent strength, and the whole is heated for 10 minutes in a boiling water bath and evaporated to dryness at 50-60° C. under reduced pressure.

Example 8

A mixture of 14 parts of ethylene diamine dihydrochloride and 17.7 parts of dicyandiamide is heated in the course of about ¾ hour to 180-185° C., and the mass is mechanically stirred as soon as it begins to liquefy. A mixture of 28 parts of ethylene diamine dihydrochloride and 35.4 parts of dicyandiamide is then introduced in the course of 2 hours at 180-185° C. The whole is stirred for 7 hours at 200-205° C. and then allowed to cool. 60 parts of the condensation product so obtained are mixed well with 9.2 parts of paraformaldehyde, and the mixture is heated for 1 hour at 175-180° C. 20 parts of the product so obtained are dissolved at about 75° C. in 18.9 parts of an aqueous formaldehyde solution of 36.8 percent strength with the addition of 20 parts of water, the pH value is adjusted to 9 by the addition of sodium hydroxide solution of 30 percent strength, and the whole is heated for 10 minutes in a boiling water bath. After drying, which is advantageously carried out at 50-60° C. under reduced pressure, there is obtained an almost colorless solid residue which is soluble in hot water.

Example 9

100 parts of cotton fabric, which has been dyed with 0.95 percent of the dyestuff obtained from diazotized dehydrothiotoluidine disulfonic acid and acetoacetic acid orthoanisidide, are after-treated for ½ hour at 20° C. in a liquor which has been prepared by dissolving 2 parts of the formaldehyde condensation product described in Example 1 in 3000 parts of water. The fabric is then freed from water and dried. In this manner a substantial improvement in the fastness to water of the dyeing is obtained.

Example 10

The procedure is the same as that described in Example 8, except that there is used a cotton fabric dyed with 1 percent of the disazo dyestuff from diazotized 4-aminoazobenzene-4'-sulfonic acid and 2-(3'-acetylamino)-benzoylamino-5-hydroxynaphthalene-7-sulfonic acid, which fabric is after-treated with 0.5 percent calculated on the weight of the material of the formaldehyde condensation product described in Example 1. In this manner a substantial improvement in the fastness to water of the dyeing is obtained.

Example 11

100 parts of a fabric of staple fibers of regenerated cellulose, which has been dyed with 2.44 percent of the symmetrical urea of the monoazo-dyestuff from diazotized 1-amino-8-hydroxynaphthalene-3:6-disulfonic acid and 1 molecular proportion of 1-amino-2-methoxy-5-methylbenzene, are treated in an aqueous solution which contains, per liter, 150 grams of methylol-urea, 5 grams of ammonium chloride, 9 grams of the formaldehyde condensation product described in Example 1 and 6 grams of copper acetate. After being squeezed, the fabric is dried, heated for 10 minutes at 130-140° C., and then washed at 30-40° C. for 10 minutes at a goods-to-liquor ratio of 1:30 with a solution which contains, per liter, 4 grams of sodium carbonate and 0.5 gram of a synthetic washing agent. The fabric is then rinsed and dried. In this manner there is obtained a material having a crease-resistant dressing and a dyeing having a high degree of fastness to washing.

Example 12

100 parts of cotton fabric, which has been dyed with 0.62 percent of the cupriferous disazo dyestuff from diazotized 2-amino-1-hydroxybenzene-4-sulfonic acid and the symmetrical urea of 2-amino-5-hydroxynaphthalene-7-sulfonic acid, are immersed at 20° C. in a liquor which has been prepared by dissolving 3 parts of copper sulfate and 3 parts of the formaldehyde condensation product described in Example 1 in 3000 parts of water. The temperature of the after-treatment bath is raised in the course of 15 minutes to 70° C., and then the after-treatment is continued for a further 15 minutes. The fabric is then freed from water and dried. In this manner a substantial improvement is obtained in the fastness to washing with soap and sodium carbonate at 70° C.

Example 13

100 parts of a fabric of staple fibers of regenerated cellulose, which has been dyed with 2.7 percent of the symmetrical urea of the monoazo-dyestuff from diazotized 1-amino-2-hydoxynaphthalene-3:6-disulfonic acid and 1 molecular proportion of 1-amino-2-methoxy-5-methylbenzene, are treated in an aqueous solution which contains, per liter, 150 grams of methylolurea, 7.5 grams of ammonium chloride, 9 grams of the formaldehyde condensation product described in Example 3 and 6 grams of copper acetate. After being squeezed the fabric is dried, heated for 10 minutes at 140° C. and then washed at 30–40° C. for 10 minutes at a goods-to-liquor ratio of 1:30 with a solution which contains, per liter, 4 grams of sodium carbonate and 0.5 gram of a synthetic washing agent. The fabric is then rinsed and dried. In this manner there is obtained a material having a crease-resistant dressing and a dyeing possessing a high degree of fastness to washing.

Example 14

The procedure is the same as that described in Example 12, except that, instead of the condensation product obtained as described in Example 2, there is used the condensation product described in Example 3. In this manner a dyeing having a high degree of fastness to washing is obtained.

Example 15

100 parts of a cotton fabric, which has been dyed with 0.8 percent of the copper compound of the azo-dyestuff from 1 molecular proportion of tetrazotized dianisidine and 2 molecular proportions of 2-hydroxynaphthalene-3:6-disulfonic acid (the copper being accompanied by demethylation), are after-treated for ½ hour at 20° C. in a liquor which has been prepared by dissolving 2 parts of the formaldehyde condensation product described in Example 4 in 3000 parts of water. The fabric is then freed from water and dried. In this manner a substantial improvement in the fastness to water of the dyeing is obtained. The improvement in fastness to water so produced is maintained to a remarkable degree even after steaming.

Example 16

The procedure is the same as that described in Example 12 except that, instead of the formaldehyde condensation product obtained as described in Example 2, there is used the condensation product described in Example 7. Also, there is used, instead of the dyeing used in Example 12 a 2.2 percent dyeing with the dyestuff named in Example 14. In this manner there is obtained a material having a crease-resistant dressing, and a dyeing possessing a high degree of fastness to washing.

Example 17

A mixture of 44.3 parts of ethylene diamine dihydrochloride and 56 parts of dicyandiamide is heated in the course of one hour to 210° C., and the mixture is mechanically stirred as soon as it begins to liquefy. A mixture of 88.6 parts of ethylene diamine dihydrochloride and 112 parts of dicyandiamide is then added at 210–215° C. in the course of about 1 hour. The temperature is raised to 250° C. in the course of about half an hour and stirring is continued for about 1 hour. The whole is then allowed to cool as long as stirring is still possible. At a temperature of 150 to 180° C. 36.8 parts of glacial acetic acid are run in in the course of about 5 minutes. 26.8 parts of para-formaldehyde of 95.6 percent strength are then added in small portions at 110–115° C. in the course of about 15 minutes. The whole is cooled with stirring to 98° C., then 150 parts of distilled water and 91 parts of formaldehyde solution of 37.1 percent strength are added. Stirring is continued for about one hour, the reaction mixture being heated in a boiling water bath. The clear solution so obtained is adjusted to a pH value of about 6 by the addition of sodium bicarbonate, and is evaporated to dryness at 50–60° C. under reduced pressure. There is obtained an almost colorless solid residue which is soluble in boiling water.

Products with similar properties are obtained, if 315 parts of formaldehyde solution of 30 percent strength are used instead of the mixture of 150 parts of water and 91 parts of formaldehyde solution of 37.1 percent strength and the reaction mixture is heated in the boiling water bath for 2 to 8 hours.

Example 18

133 parts of ethylene diamine dihydrochloride and 168 parts of dicyandiamide are mixed together, and then the mixture is introduced in the course of about 2 hours in small portions, while stirring into a flask immersed in a heating bath having a temperature of 250–255° C. In this manner there is produced an easily stirrable melt. The internal temperature is finally about 243° C. Stirring is continued for one hour at an internal temperature of about 248–255° C. During the mixing operation and during the subsequent stirring ammonia splits off. The internal temperature is then allowed to fall to about 220° C., and then 43.4 parts of boric acid are introduced. After cooling the reaction mixture to about 152° C., there are run in in the course of about 5 minutes 36.6 parts of glacial acetic acid, while stirring. By further cooling the internal temperature is reduced to about 110–113° C., and then 26.6 parts of para-formaldehyde of 95.7 percent strength are introduced in the course of about 15 minutes. The internal temperature is then allowed to fall to about 100° C. and 112 parts of an aqueous solution of formaldehyde of 36.5 percent strength and also 131 parts of water are introduced in the course of about 5 minutes. The whole is heated for 4¾ hours at 99–100° C. under reflux, and after being cooled the mixture is neutralized with about 30 parts of sodium bicarbonate to give a pH-value of about 5.3.

There are obtained 622 parts of a clear solution (solution A) having a content of dry substance of 61.7 percent. By drying the solution at 50–60° C. under reduced pressure, there is obtained an almost colorless residue which is easily soluble in water.

77.8 parts of the above solution A (one-eighth of the total quantity), 33.5 parts of ammonium chloride and 51 parts of formaldehyde solution of 36.8 percent strength are heated for 4 hours at the boil under reflux. By drying the mixture at 50–60° C. under reduced pressure there is obtained a practically colorless residue, which is soluble in hot water and can be used for after-treating dyeings of direct-dyeing dyestuffs.

Example 19

A mixture of 44.3 parts of ethylene diamine dihydrochloride and 56 parts of dicyandiamide is heated in the course of about ¾ hour to 215° C., the mixture being stirred as soon as liquefaction occurs. There is then added a mixture of 88.6 parts of ethylene diamine dihydrochloride and 112 parts of dicyandiamide in the course of one hour at an internal temperature of 215–235° C. The temperature is increased to 250° C. in the course of about 30 minutes, and the whole is stirred for ¼ hour at an internal temperature of 250–255° C. The whole is then allowed to cool to 220° C., while stirring, and the further procedure is exactly as described in Example 18, the quantities given therein of boric acid, glacial acetic acid, para formaldehyde, formaldehyde solution and water being introduced. For neutralisation to give a pH value of about 5.3 there are likewise used about 30 parts of sodium bicarbonate.

There are obtained 625 parts of a clear solution having a content of dry substance of about 61.8 percent (solution B). By drying the mixture at 50–60° C. under reduced pressure there is obtained an approximately colorless residue, which is clearly soluble in water.

78.1 parts of the above solution B, 33.5 parts of ammonium chloride and 51 parts of formaldehyde solution of 36.8 percent strength are heated for 4 hours under reflux at the boil, and then the whole is evaporated to dryness under reduced pressure at 50–60° C. Prepared in this manner the new condensation product is obtained as a solid, practically colorless mass, which can be taken up in hot water to give a clear solution. By after-treatment with this product direct-dyeings are improved in their properties of wet fastness.

Example 20

77.8 parts of solution A described in Example 18, 67 parts of ammonium chloride and 81.7 parts of formaldehyde solution of 36.8 percent strength are heated for 4 hours at the boil under reflux. By drying the mixture under reduced pressure at 50–55° C., the new condensation product is obtained as a solid, practically colorless residue, which dissolves easily in hot water and improves the properties of wet fastness of dyeings produced with substantive dyestuffs.

Example 21

78.1 parts of solution B described in Example 19, 67 parts of ammonium chloride and 81.7 parts of formaldehyde solution of 36.8 percent strength are heated for 4 hours at the boil under reflux. By drying the mixture at 50–60° C. under reduced pressure there is obtained a colorless solid mass which is easily soluble in water and can be used in the same manner as the products of the preceding examples.

Example 22

22.1 parts of dicyandiamide are introduced at 60–80° C. into 25.1 parts of hydrochloric acid of 38.4 percent strength, and then the mixture is heated for 15 minutes at 90–95° C. The solution of dicyandiamidine hydrochloride so obtained is mixed with 77.8 parts of solution A described in Example 18 and 20.4 parts of formaldehyde solution of 36.8 percent strength, and the whole is heated for 4 hours at the boil under reflux. By drying the mixture at 50–60° C. under reduced pressure the new condensation product is obtained in the form of a solid residue, which is fairly easily soluble in water and improves the properties of wet fastness of dyeings produced with direct-dyeing dyestuffs.

Example 23

13.5 parts of diethylene triamine are neutralized with concentrated sulfuric acid, 77.8 parts of solution A described in Example 18 are added and also 30.6 parts of formaldehyde solution of 36.8 percent strength, and the whole is heated for 4 hours at the boil under reflux. By drying the mixture, which is advantageously carried out at 50–55° C. under reduced pressure, the new condensation product is obtained in the form of a solid easily pulverisable mass, which dissolves easily in water at room temperature. The new condensation product can be used for improving dyeings of substantive dyestuffs.

Example 24

100 parts of a cotton fabric, which has been dyed with 0.9 percent of a brown-dyeing copper compound of the trisazo-dyestuff obtained by coupling the intermediate product of tetrazotized benzidine and salicyclic acid with the monoazo-dyestuff from diazotized 1-amino-2-oxybenzene-5-sulfonic acid and resorcinol, are after-treated for ½ hour at 20° C. in a bath prepared by dissolving 2 parts of the formaldehyde condensation product described in the last paragraph of Example 18 in 3000 parts of water. The fabric is then freed from water and dried. In this manner the fastness to water of the dyeing is considerably improved.

Example 25

100 parts of a cotton fabric which has been dyed with 1.6 percent of the brown-dyeing stilbene azo-dyestuff obtained by condensing one molecular proportion of dinitrostilbene disulfonic acid with one molecular proportion of the azo-dyestuff from diazotized 1-aminobenzene-4-sulfonic acid and 1-amino-naphthalene, is after-treated for ½ hour at 20–60° C. in a bath prepared by dissolving 2 parts of the formaldehyde condensation product described in the last paragraph of Example 18 in 3000 parts of water. The fabric is then freed from water and dried. In this manner the fastness to washing of the dyeing is considerably improved.

Example 26

100 parts of a fabric of staple fibers of regenerated cellulose, which has been dyed with 2.44 percent of the red-dyeing symmetrical urea compound of the monoazo-dyestuff from diazotized 1-amino-8-oxynaphthalene-3:6-disulfonic acid and 1 molecular proportion of 1-amino-2-methoxy-5-methyl-benzene, is treated in an aqueous solution which contains, per liter, 150 grams of methylolurea, 5 grams of ammonium chloride, 9 grams of the formaldehyde condensation product described in the last paragraph of Example 18 and 6 grams of copper acetate. After squeezing the fabric, it is dried, heated for 10 minutes at 130–140° C., and then washed at 30–40° C. for 10 minutes at a liquor ratio of 1:30 with a solution containing per liter, 4 grams of sodium carbonate and 0.5 gram of a synthetic detergent. The fabric is then rinsed and dried. In this manner there is obtained a material which has an anti-creasing dressing and of which the dyeing has a high fastness to washing.

Example 27

The procedure is the same as described in Example 25, except that a dyeing with 1.44 percent of the dyestuff mentioned in Example 26 is after-treated. In this manner the fastness to washing of the dyeing is considerably improved.

Example 28

100 parts of a cotton fabric, which has been dyed with 1.2 percent of the green-dyeing trisazo-dyestuff obtained by condensing 1 molecular proportion of cyanuric chloride with (a) 1 molecular proportion of the disazo-dyestuff from diazotized 1-amino-8-oxynaphthalene-3:6-disulfonic acid and coupling with 1-amino-2-methoxy-5-methyl-benzene, further diazotizing, and coupling in an alkaline medium with one molecular proportion of 1-amino-8-oxynaphthalene-3:6-disulfonic acid, (b) 1 molecular proportion of 1-amino-4'-oxy-azobenzene-3'-carboxylic acid and (c) aniline, is immersed at 20° C. in a liquor prepared by dissolving 3 parts of copper sulfate and 3 parts of the formaldehyde condensation product described in the last paragraph of Example 18 in 3000 parts of water. The temperature of the after-treatment bath is raised in the course of 15 minutes to 70° C., and then the after-treatment is continued for a further 15 minutes. The fabric is then freed from water and dried. In this manner the fastness to washing of the dyeing with respect to washing with soap and sodium carbonate at 70° C. is considerably improved.

A considerable improvement in the fastness to washing of the dyeing is also produced by after-treatment with the condensation product alone.

What we claim is:

1. A condensation product of (a) 1 to 2 molecular proportions of dicyandiamide with (b) about one molecular proportion of a neutral, water-soluble salt of an inorganic acid with an aliphatic amine of the formula

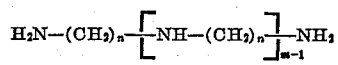

in which $m$ represents a whole number of at the most 3 and $n$ represents a whole number of at least 2 and at the most 3, and with (c) 0.25 to 6 molecular proportions of formaldehyde in the form of paraformaldehyde, which condensation product has been produced in the absence of water and at a temperature above 100° C., but below the decomposition point of the condensation product.

2. A condensation product of (a) 1 to 2 molecular proportions of dicyandiamide with (b) about one molecular proportion of a neutral, water-soluble salt of an inorganic acid with ethylene diamine, and with (c) 0.25 to 6 molecular proportions of formaldehyde in the form of paraformaldehyde, which condensation product has been produced in the absence of water and at a temperature above 100° C., but below the decomposition point of the condensation product.

3. A condensation product of (a) 1 to 2 molecular proportions of dicyandiamide with (b) about one molecular proportion of ethylene diamine dihydrochloride, and with (c) 0.25 to 6 molecular proportions of formaldehyde in the form of paraformaldehyde, which condensation product has been produced in the absence of water and at a temperature above 100° C., but below the decomposition point of the condensation product.

4. A condensation product of (a) two molecular proportions of dicyandiamide with (b) about one molecular proportion of ethylene diamine dihydrochloride, and with (c) 0.5 to 6 molecular proportions of formaldehyde in the form of paraformaldehyde, which condensation product has been produced in the absence of water and at a temperature above 100° C., but below the decomposition point of the condensation product.

5. A condensation product of (a) two molecular proportions of dicyandiamide with (b) about one molecular proportion of ethylene diamine dihydrochloride, and with (c) 0.5 to 2 molecular proportions of formaldehyde in the form of para-formaldehyde, which condensation product has been produced in the absence of water and at a temperature above 100° C., but below the decomposition point of the condensation product.

6. A condensation product of (a) dicyandiamide with (b) ethylene diamine dihydrochloride and with (c) formaldehyde, which condensation product has been produced by condensing (a) two molecular proportions of dicyandiamide with (b) about one molecular proportion of ethylene diamine dihydrochloride and with (c) 0.5 to 2 molecular proportions of formaldehyde in the form of para-formaldehyde in the absence of water and at a temperature above 100° C., but below the decomposition point of the condensation product, and then condensing the condensation product so obtained with (d) 1 to 6 molecular proportions of formaldehyde in the presence of water.

7. A condensation product of (a) dicyandiamide with (b) ethylene diamine dihydrochloride and with (c) formaldehyde, which condensation product has been produced by condensing (a) two molecular proportions of dicyandiamide with (b) about one molecular proportion of ethylene diamine dihydrochloride at 210 to 260° C. in the absence of water, then condensing the product so obtained with (c) 0.5 to 2 molecular proportions of formaldehyde in the form of para-formaldehyde in the absence of water and in the presence of acetic acid at 105 to 130° C., and thereupon condensing the product thus obtained in the presence of water with (d) 1 to 6 molecular proportions of formaldehyde.

8. A condensation product of (a) dicyandiamide with (b) ethylene diamine dihydrochloride and with (c) formaldehyde, which condensation product has been produced by condensing (a) two molecular proportions of dicyandiamide with (b) one molecular proportion of ethylene diamine dihydrochloride at 210 to 260° C. in the absence of water, then condensing the product so obtained with (c) 0.5 to 1 molecular proportion of formaldehyde in the form of paraformaldehyde in the absence of water and in the presence of acetic acid at 105 to 120° C., and thereupon condensing the product thus obtained in the presence of water and acetic acid with (d) 1 to 2 molecular proportions of formaldehyde at 90 to 95° C.

9. A condensation product of (a) dicyandiamide with (b) a neutral, water-soluble salt of an inorganic acid with an aliphatic amine of the formula

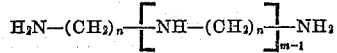

in which m represent a whole number of at the most 3 and n represents a whole number of at least 2 and at the most 3, and with (c) formaldehyde, which condensation product has been produced by condensing (a) 1 to 2 molecular proportions of dicyandiamide with (b) about one molecular proportion of the amine salt, and with (c) 0.25 to 6 molecular proportions of formaldehyde in the form of paraformaldehyde in the absence of water and at a temperature above 100° C., but below the decomposition point of the condensation product, and then condensing the product so obtained with (d) formaldehyde and (e) a water-soluble salt of a nitrogenous base in the presence of a solvent.

10. A condensation product of (a) dicyandiamide with (b) ethylene diamine dihydrochloride and with (c) formaldehyde, which condensation product has been produced by condensing (a) at least one molecular proportion of dicyandiamide with (b) one molecular proportion of ethylene diamine dihydrochloride at 210 to 260° C. in the absence of water, then condensing the product so obtained with (c) 0.5 to 1 molecular proportion of formaldehyde in the form of para-formaldehyde in the absence of water and in the presence of acetic acid at 105 to 130° C., and thereupon condensing the product so obtained with (d) 1 to 10 molecular proportions of formaldehyde and (e) a water soluble salt of a nitrogenous base, the condensations (d) and (e) being carried out in the presence of water.

11. A condensation product of (a) dicyandiamide with (b) ethylene diamine dihydrochloride and with (c) formaldehyde, which condensation product has been produced by condensing (a) at least one molecular proportion of dicyandiamide with (b) one molecular proportion of ethylene diamine dihydrochloride at 210 to 260° C. in the absence of water, then condensing the product so obtained with (c) 0.5 to 1 molecular proportion of formaldehyde in the form of para-formaldehyde in the absence of water and in the presence of acetic acid and boric acid at 105 to 130° C., and thereupon condensing the product so obtained with (d) 1 to 10 molecular proportions of formaldehyde and (e) a water-soluble salt of a nitrogenous base, the condensations (d) and (e) being carried out in the presence of water.

12. A condensation product of (a) dicyandiamide with (b) ethylene diamine dihydrochloride and with (c) formaldehyde, which condensation product has been produced by condensing (a) two molecular proportions of dicyandiamide with (b) about one molecular proportion of ethylene diamine dihydrochloride at 210 to 260° C. in the absence of water, then condensing the product so obtained with 0.5 to 1 molecular proportion of formaldehyde in the form of para-formaldehyde in the absence of water and in the presence of acetic acid and boric acid at 105 to 120° C. and thereupon condensing the product so obtained with (d) 2 to 10 molecular proportions of formaldehyde and (e) 1 to 10 molecular proportions of ammonium chloride, the condensations (d) and (e) being carried out in the presence of water.

13. A condensation product of (a) dicyandiamide with (b) ethylene diamine dihydrochloride and with (c) formaldehyde, which condensation product has been produced by condensing (a) two molecular proportions of dicyandiamide with (b) about one molecular proportion of ethylene diamine dihydrochloride at 210 to 260° C. in the absence of water, then condensing the product so obtained with 0.5 to 1 molecular proportion of formaldehyde in the form of paraformaldehyde in the absence of water and in the presence of acetic acid and boric acid at 105 to 120° C. and thereupon condensing the product so obtained with (d) 1 to 2 molecular proportions of formaldehyde in the presence of water and finally with (e) 4 to 8 molecular proportions of ammonium chloride and a further 4 to 8 molecular proportions of formaldehyde in the presence of water.

14. A condensation product of (a) dicyandiamide with (b) ethylene diamine dihydrochloride and with (c) formaldehyde, which condensation product has been produced by condensing (a) two molecular proportions of dicyandiamide with (b) one molecular proportion of ethylene diamine dihydrochloride at 210 to 260° C. in the absence of water, then condensing the product so obtained with 0.5 to 1 molecular proportion of formaldehyde in the form of paraformaldehyde in the absence of water and in the presence of acetic acid and about 0.7 molecular proportions of boric acid at 105 to 120° C., and thereupon condensing the product so obtained, after neutralization by means of an alkali carbonate, with (d) about 1.5 molecular proportions of formaldehyde in the presence of water and finally with (e) about 5 molecular proportions of ammonium chloride and a further 5 molecular proportions of formaldehyde in the presence of water.

References Cited in the file of this patent

UNITED STATES PATENTS

| | | |
|---|---|---|
| 2,214,067 | Petersen | Sept. 10, 1940 |
| 2,334,545 | D'Alelio | Nov. 16, 1944 |
| 2,366,129 | Rust | Dec. 26, 1944 |
| 2,418,696 | Cameron et al. | Apr. 8, 1947 |
| 2,474,909 | Olpin et al. | July 5, 1949 |
| 2,774,749 | Stanley et al. | Dec. 18, 1956 |

FOREIGN PATENTS

| | | |
|---|---|---|
| 594,791 | Great Britain | Nov. 19, 1947 |